UNITED STATES PATENT OFFICE.

ROBERT A. HOLBROOK, OF CHICAGO HEIGHTS, ILLINOIS.

SHORTENING AND LEAVENING PREPARATIONS.

1,210,940.

Specification of Letters Patent. Patented Jan. 2, 1917.

No Drawings. Application filed December 30, 1915. Serial No. 69,342.

*To all whom it may concern:*

Be it known that I, ROBERT A. HOLBROOK, a citizen of the United States, and a resident of Chicago Heights, county of Cook, and State of Illinois, have invented certain new and useful Improvements in Shortening and Leavening Preparations, of which the following is a specification.

The invention relates to baking preparations and seeks to provide an improved compound which is stable, *i. e.* such that it can be marketed and kept without material deterioration for a considerable period of time, and which, when mixed with flour and water to form dough will serve both to shorten and leaven the same.

Further objects of the invention are to provide a combined shortening and leavening preparation of lard-like consistency which will not become rancid and in which pulverized acid phosphates may be used as baking acids without rendering the preparation unstable. The shortening ingredient or fat employed in the improved product, is preferably a suitable vegetable oil, such as cotton-seed oil, thickened to a lard-like consistency. The cotton-seed oil is thickened to the desired consistency in any suitable manner, but, preferably, by partial hydrogenization or by mixing it with from six to ten per cent. of hardened, hydrogenated cotton-seed oil. Such a fat, will not become rancid and does not, as an animal fat or lard appears to do, more readily acquire rancidity when admixed with leavening ingredients.

The fat should be quite free from water, and baking powder or leavening materials, such as a suitable carbonate and a baking acid, are intimately mixed therewith, either by stirring the leavening ingredients into the melted fat or mixing the same with the cold solid fat in a suitable mixing machine. The fat and leavening materials are employed in such proportions that when the improved preparation is mixed with about eight parts by weight of flour and with sufficient water or milk to form dough and baked, the biscuits or like product is properly shortened and leavened. Preferably also a suitable amount of common salt for seasoning the product is mixed into the preparation so that the baker need only add it to flour and water or milk to form the dough.

As stated, the improved product does not become rancid and, since the baking powder is embedded in the body of lard-like fat it cannot absorb moisture from the air and hence retains its gas producing capacity in full. Furthermore the baking results attained are found to be superior to those effected by separately mixing the shortening and baking powder in the dough in the ordinary manner. This is because the baking powder ingredients are embedded in the shortening fat and the development of the leavening gas is, for that reason, diminished or retarded in the cold dough, and hence more of the leavening action occurs when the dough is exposed to the heat of the baking oven. For this reason also, the improved preparation is also more economical since by its use a smaller amount of the leavening ingredients is required. Thus, if as preferred, baking soda (sodium bi-carbonate) is used in the improved preparation as the source of the leavening gas (carbon di-oxid), the amount needed to properly leaven a given quantity of flour is about twenty five per cent. less than is ordinarily required, and the amount of baking acid required to react with the soda is likewise reduced.

The leavening ingredients used in the improved preparation are preferably sodium bi-carbonate, as stated, and a suitable, finely pulverized, acid phosphate such as mono-calcium phosphate or mono-sodium phosphate. The acid-phosphate and particularly, mono-calcium and mono-sodium phosphate, are inexpensive and efficient baking acids, but they absorb atmospheric moisture and must therefore be especially prepared or treated for use in a baking powder. Thus, in a stable baking powder, mono-calcium phosphate must be used in granular form, (*i. e.* such that it will not pass through a 156 mesh sieve) rather than in pulverulent form, (*i. e.* such as would pass through a 200 mesh sieve) although, except for the reason given, the pulverulent form would be preferred. But, since the leavening ingredients are embedded in a body of shortening fat, finely pulverized acid phosphates can be employed in the present improved preparation without interfering with its keeping qualities and with great advantage in the baking results attained. Like the acid phosphate, the sodium bi-carbonate and salt employed are preferably finely pulverized and dried.

In preparing the improved shortening and leavening compound, the materials and proportions by weight are preferably as follows:—

| | |
|---|---|
| Thickened cotton-seed oil | 7 parts. |
| Sodium bi-carbonate | 1 part. |
| Mono-calcium phosphate | 1.25 parts. |
| Salt | 1 part. |

As indicated, the leavening and seasoning ingredients are dried, finely pulverized and intimately mixed with the thickened cotton-seed oil either in the hot or cold state. The proportions given are such that one part by weight of the improved preparation will be sufficient to properly shorten and leaven dough containing eight parts by weight of flour, which is the proportion in which common animal shortening fat or lard is generally used.

It should be understood that the details set forth may be varied without departure from the essentials of the invention as defined in the claims.

I claim as my invention:—

1. A stable baking preparation comprising a body of thickened vegetable oil, a carbonate and a baking acid in proper proportions to form a combined shortening and leavening compound, the carbonate and the baking acid being intimately mixed and embedded in the body of thickened vegetable oil, substantially as described.

2. A stable leavening and shortening preparation comprising a body of thickened vegetable oil of lard-like consistency intimately admixed with a baking powder, substantially as described.

3. A stable baking preparation comprising an edible fat, a carbonate, and a finely pulverized acid phosphate in proper proportions to form a combined shortening and leavening compound the carbonate and the phosphate being intimately mixed and embedded in the shortening fat, substantially as described.

4. A stable leavening and shortening preparation comprising an intimate admixture of a body of edible fat of lard-like consistency, a carbonate, and a finely pulverized acid phosphate, substantially as described.

5. A stable leavening acid shortening preparation comprising a mixture of a body of edible fat of lard-like consistency, baking soda in substantially the proportion of seven parts by weight of fat to one part of soda, and a sufficient amount of a baking acid to react with the soda, substantially as described.

6. A stable leavening and shortening preparation comprising a body of thickened vegetable oil, a baking powder, and common salt, the baking powder and salt being intimately admixed and embedded in the body of thickened vegetable oil, substantially as described.

7. A stable leavening and shortening preparation comprising a body of thickened vegetable oil, a carbonate, and a finely pulverized acid phosphate, the carbonate and phosphate being intimately admixed and embedded in the body of thickened vegetable oil, substantially as described.

8. A stable leavening and shortening preparation comprising an intimate admixture of a body of thickened cotton-seed oil of lard-like consistency and a baking powder, substantially as described.

9. A stable leavening and shortening preparation comprising an intimate admixture of a body of thickened cotton-seed oil of lard-like consistency, a carbonate, a finely pulverized acid phosphate, and common salt in substantially the proportions specified.

10. A stable leavening and shortening preparation comprising an intimate admixture of a body of edible fat of lard-like consistency, a carbonate and finely pulverized mono-sodium phosphate, substantially as described.

ROBERT A. HOLBROOK.